UNITED STATES PATENT OFFICE.

MORITZ ULRICH, OF ELBERFELD, GERMANY, ASSIGNOR TO THE FARBEN-FABRIKEN, VORMALS FR. BAYER & CO., OF SAME PLACE.

AZO DYE.

SPECIFICATION forming part of Letters Patent No. 417,294, dated December 17, 1889.

Application filed September 11, 1889. Serial No. 323,606. (Specimens.)

*To all whom it may concern:*

Be it known that I, MORITZ ULRICH, doctor of philosophy, residing at Elberfeld, in the Empire of Germany, assignor to the FARBEN-FABRIKEN, VORMALS FR. BAYER & CO., at Elberfeld, have invented a new and useful Improvement in the Manufacture of Dye-Stuffs or Coloring-Matters, of which the following is a specification.

My invention relates to the production of new blue azo color for dyeing unmordanted cotton, wool, and silk by the action of tetrazodiphenolalkyl ether upon the dioxynaphthaline monosulpho-acid gained by melting the so-called "alpha-naphthol alpha-disulpho-acid S" described in the German patent, No. 40,571, of the Schöllkopf Aniline and Chemical Company, in Buffalo, with caustic alkali.

In carrying out my process practically I proceed as follows: Twenty (20) kilos diamidodiphenol ether (dianisidine) are dissolved in three hundred liters water and forty (40) kilos muriatic acid of the specific gravity of 1.161. To this solution, cooled by ice, eleven (11) kilos sodium nitrite dissolved in water are gradually added. The thus-obtained tetrazo-diphenol ether is then allowed to run slowly into an alkaline solution of forty (40) kilos of the dioxynaphthaline monosulpho-acid produced by melting the so-called "alpha-naphthol alpha-disulpho-acid S" with caustic alkali. A deep-blue precipitate is immediately formed. This is filtered and dried.

My new product thus obtained forms a black amorphous powder dissolving easily in cold water, giving a blue solution which turns red violet by adding alkali.

By dissolving in concentrated sulphuric acid a deep greenish-blue solution is formed, which gives, after the addition of water, a blue precipitate.

My new dye-stuff dyes cotton not mordanted in a boiling soap bath a clear greenish blue, greener than the product produced by combining tetrazo-diphenol ether with the isomeric dioxynaphthaline monosulpho-acid of the beta-naphthol beta-monosulpho-acid, (G salt,) and described and claimed by me in a separate specification. It has the following chemical composition and formula:

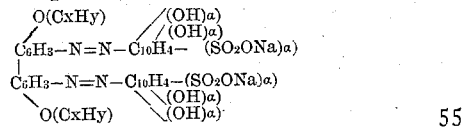

What I claim as my invention, and desire to secure by Letters Patent, is—

The coloring-matter herein described, which is produced by the action of tetrazo-diphenol ether upon the dioxynaphthaline monosulpho-acid obtained by melting the so-called "alpha-naphthol alpha-disulpho-acid S" with caustic alkali, and which forms a black amorphous powder giving a blue solution when dissolved in water, turning red violet by adding caustic alkali; in concentrated sulphuric acid it dissolves with deep greenish-blue color, and a blue precipitate of the dye-stuff acid is formed by adding water; unmordanted cotton is dyed by it in an alkaline soap bath a clear greenish blue fast to soap and mineral acid.

In testimony whereof I have signed my name in presence of two subscribing witnesses.

MORITZ ULRICH.

Witnesses:
CARL DUISBERG,
KARL KREKELER.